US011109272B2

(12) United States Patent
Qin

(10) Patent No.: US 11,109,272 B2
(45) Date of Patent: Aug. 31, 2021

(54) COMMUNICATION METHOD AND DEVICE FOR WIRELESS COMMUNICATION NETWORK AND WIRELESS COMMUNICATION NETWORK WITH TRAFFIC ESTIMATION OFFLOADING FEATURES

(71) Applicant: Sony Corporation, Tokyo (JP)

(72) Inventor: Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/579,842

(22) Filed: Sep. 24, 2019

(65) Prior Publication Data

US 2020/0022025 A1 Jan. 16, 2020

Related U.S. Application Data

(63) Continuation of application No. 15/914,686, filed on Mar. 7, 2018, now Pat. No. 10,470,081, which is a
(Continued)

(30) Foreign Application Priority Data

Jan. 30, 2013 (CN) .......................... 201310036634.8

(51) Int. Cl.
*H04W 28/08* (2009.01)
*H04W 72/04* (2009.01)
(Continued)

(52) U.S. Cl.
CPC .............. *H04W 28/08* (2013.01); *H04L 5/14* (2013.01); *H04W 16/02* (2013.01); *H04W 72/04* (2013.01);
(Continued)

(58) Field of Classification Search
CPC ........ H04L 5/14; H04W 16/02; H04W 72/04; H04W 72/0486; H04W 88/08; H04W 28/0808
See application file for complete search history.

(56) References Cited

U.S. PATENT DOCUMENTS 8,331,236 B2 * 12/2012 Cavalli ................. H04W 36/22
370/235
2010/0142466 A1 6/2010 Palanki et al.
(Continued)

FOREIGN PATENT DOCUMENTS

CN 101047942 A 10/2007
CN 101615947 A 12/2009
(Continued)

OTHER PUBLICATIONS

International Search Report dated Mar. 27, 2014 in PCT/CN2013/090529 Filed Dec. 26, 2013.
(Continued)

*Primary Examiner* — Shukri Taha
(74) *Attorney, Agent, or Firm* — Xsensus LLP

(57) ABSTRACT

The art relates to a communication method and device for a wireless communication network and a wireless communication network. In the communication method, to one cell cluster in at least one cell cluster included in the wireless communication network, an Uplink-downlink ratio configuration scheme of the cell cluster during the next ratio configuration adjusting period is determined based on un-allocatable prediction amount for un-allocatable services of each cell in the cell cluster, and allocatable prediction amount for the services, which can be allocated to other cell(s), of each cell in the cell cluster, thus utilization efficiency of communication resource is optimized, and the cells in the cell cluster have the same communication frequency and Uplink-downlink ratio configuration scheme.

(Continued)

According to the embodiments of the invention, the utilization efficiency of communication resource can be improved.

10 Claims, 6 Drawing Sheets

Related U.S. Application Data continuation of application No. 14/758,928, filed as application No. PCT/CN2013/090529 on Dec. 26, 2013, now Pat. No. 9,942,799.

(51) Int. Cl.
  *H04W 16/02* (2009.01)
  *H04L 5/14* (2006.01)
  *H04W 88/08* (2009.01)

(52) U.S. Cl.
  CPC ........ *H04W 72/0486* (2013.01); *H04W 88/08* (2013.01)

(56) References Cited

U.S. PATENT DOCUMENTS

| | | | |
|---|---|---|---|
| 2010/0173644 A1 | 7/2010 | Koyanagi | |
| 2011/0263265 A1 | 10/2011 | Caretti et al. | |
| 2013/0208587 A1* | 8/2013 | Bala | H04W 16/14 370/230 |
| 2013/0322235 A1* | 12/2013 | Khoryaev | H04W 28/0289 370/229 |
| 2013/0336177 A1* | 12/2013 | Gao | H04L 5/1476 370/280 |
| 2014/0153454 A1* | 6/2014 | Samdanis | H04L 5/1469 370/280 |
| 2014/0177492 A1* | 6/2014 | Sun | H04L 5/1469 370/280 |
| 2014/0376369 A1 | 12/2014 | Zhu et al. | |
| 2015/0271729 A1 | 9/2015 | Sirotkin et al. | |

FOREIGN PATENT DOCUMENTS

| | | |
|---|---|---|
| CN | 102271336 A | 12/2011 |
| CN | 102291775 A | 12/2011 |
| WO | 2011/157030 A1 | 12/2011 |
| WO | 2012/134580 A1 | 10/2012 |
| WO | 2012/152229 A1 | 11/2012 |
| WO | 2013/180955 A1 | 12/2013 |

OTHER PUBLICATIONS

Office Action dated Oct. 25, 2017 in Australian Patent Application No. 2013376515.

Shen et al., "Dynamic Uplink-Downlink Configuration and Interference Management in TD-LTE", IEEE Communications Magazine, vol. 50, Issue 11, Nov. 2012, pp. 51-59.

Office Action dated Dec. 8, 2020 in Canadian Patent Application No. 2,898,547, 5 pages.

\* cited by examiner

COMMUNICATION METHOD AND DEVICE FOR WIRELESS COMMUNICATION NETWORK AND WIRELESS COMMUNICATION NETWORK WITH TRAFFIC ESTIMATION OFFLOADING FEATURES

This application is a continuation of U.S. application Ser. No. 15/914,686, filed Mar. 7, 2018, which is a continuation of U.S. application Ser. No. 14/758,928, filed Jul. 1, 2015 (now U.S. Pat. No. 9,942,799), which is a National Phase of PCT/CN2013/90529, filed Dec. 26, 2013, which claims the benefit of Chinese Patent Application 201310036634.8, filed on Jan. 30, 2013, the entire contents of each of which are incorporated herein by reference.

FIELD OF THE INVENTION

The present application relates to a communication method and apparatus for a wireless communication network and a wireless communication network. Particularly, the present application relates to a communication method and apparatus for a wireless communication network and a wireless communication network which can adjust an uplink-downlink ratio configuration scheme of a cell cluster in the wireless communication network dynamically.

BACKGROUND OF THE INVENTION

In a traditional TDD (Time Division Duplexing) cell communication network, the uplink-downlink ratio configuration scheme cannot be adjusted dynamically. If a cell is to perform service distribution with an intra-frequency or inter-frequency adjacent cell, a bandwidth requirement of service required to be distributed and extra bandwidth resources which can be provided by the cell after the cell's bandwidth requirement for the service of the cell itself is satisfied are compared, after the bandwidth resources (including both uplink bandwidth resources and downlink bandwidth resources) which can be provided by the cell are determined based on the uplink-downlink ratio configuration scheme of the cell, so as to determine how to perform distribution on the service. To be noted, the distribution of data is performed in the unit of a cell.

Recently, under the scenario of heterogeneous networks in a wireless communication network, to enhance the self-adaptiveness of uplink and downlink service transmitting, in version 12 of LTE-A (Long term evolution-Advanced) system, an adjusting mechanism of the uplink-downlink ratio configuration scheme is introduced.

SUMMARY OF THE INVENTION

However, when adjusting the uplink-downlink ratio configuration scheme, it is a problem of great challenge whether to take the bandwidth requirement of the distributed service into consideration.

On one hand, if the bandwidth requirement of the distributed service is not taken into consideration at all, each cell cannot know its distribution situation with neighboring cells, so that the uplink-downlink ratio configuration scheme acquired by adjusting may not well reflect the uplink and downlink bandwidth requirement of the whole network.

On the other hand, if the bandwidth requirement of all the potential distributed service is taken into consideration in an uplink and downlink ratio configuration adjusting period, the quality of service of the service of the cell itself may be affected. Generally, when adjusting the uplink-downlink ratio configuration scheme, the service of the cell itself should have higher priority level than the distributed service.

For this purpose, there is provided a communication method and apparatus for a wireless communication network and a wireless communication system, which can improve the adjustment to the uplink-downlink ratio configuration scheme of the cell cluster, so that the communication efficiency is optimized.

According to an embodiment of the present application, there is provided a communication method for a wireless communication network, wherein: with respect to one cell cluster of at least one cell cluster included in the wireless communication network, based on a predicted non-distributable amount of non-distributable service of each cell in that cell cluster, and a predicted distributable amount of service of each cell in that cell cluster which is able to be distributed with other cells, an uplink-downlink ratio configuration scheme of that cell cluster within a next ratio configuration adjusting period is determined in order to optimize the utilization efficiency of communication resources, and cells in each cell cluster have a same communication frequency and a same uplink-downlink ratio configuration scheme.

According to an embodiment of the present application, there is further provided an apparatus for adjusting an uplink-downlink ratio configuration scheme of cell clusters in a wireless communication network, wherein cells in each cell cluster have a same communication frequency and a same uplink-downlink ratio configuration scheme. The apparatus includes: a configuration unit, configured to, with respect to one cell cluster of at least one cell cluster included in the wireless communication network, determine the uplink-downlink ratio configuration scheme of that cell cluster within a next ratio configuration adjusting period, based on a predicted non-distributable amount of non-distributable service of each cell in that cell cluster, and a predicted distributable amount of service of each cell in that cell cluster which is able to be distributed with other cells, in order to optimize the utilization efficiency of communication resources; and a communication unit, configured to, with respect to that cell cluster, provide the determined uplink-downlink ratio configuration scheme of that cell cluster within the next ratio configuration adjusting period to a base station in that cell cluster.

According to an embodiment of the present application, there is further provided a wireless communication system, which includes: at least one cell cluster, cells in each of which have a same communication frequency and a same uplink-downlink ratio configuration scheme, and an apparatus for adjusting an uplink-downlink ratio configuration scheme of cell clusters. The apparatus includes: a configuration unit, configured to, with respect to one cell cluster of the at least one cell cluster, determine the uplink-downlink ratio configuration scheme of that cell cluster within a next ratio configuration adjusting period, based on a predicted non-distributable amount of non-distributable service of each cell in that cell cluster, and a predicted distributable amount of service of each cell in that cell cluster which is able to be distributed with other cells, in order to optimize the utilization efficiency of communication resources; and a communication unit, configured to, with respect to that cell cluster, provide the determined uplink-downlink ratio configuration scheme of that cell cluster within the next ratio configuration adjusting period to a base station in that cell cluster.

According to another embodiment of the present application, there is further provided a program, which causes a computer executing the program to implement the communication method for a wireless communication network, wherein: with respect to one cell cluster of at least one cell cluster included in the wireless communication network, based on a predicted non-distributable amount of non-distributable service of each cell in that cell cluster, and a predicted distributable amount of service of each cell in that cell cluster which is able to be distributed with other cells, an uplink-downlink ratio configuration scheme of that cell cluster within a next ratio configuration adjusting period is determined in order to optimize the utilization efficiency of communication resources, and cells in each cell cluster have a same communication frequency and a same uplink-downlink ratio configuration scheme.

According to an embodiment of the present application, there is further provided a corresponding computer readable storage medium, on which programs capable of being executed by a computing device are stored. The programs, when executed, can cause the computing device to implement the above mentioned processing method.

By the communication method and apparatus for the wireless communication network and the wireless communication system provided by the embodiments of the present application, the adjustment to the uplink-downlink ratio configuration scheme of the cell cluster can be improved, so that the communication efficiency is optimized

DETAILED DESCRIPTION OF THE INVENTION

Hereinafter, the foregoing and other features and advantages of the present invention will be more apparent by illustrating in detail a preferred embodiment of the present invention in conjunction with accompanying drawings.

In the following, description will be made according to the following order:

1. The communication method for the wireless communication network

Figure 1:
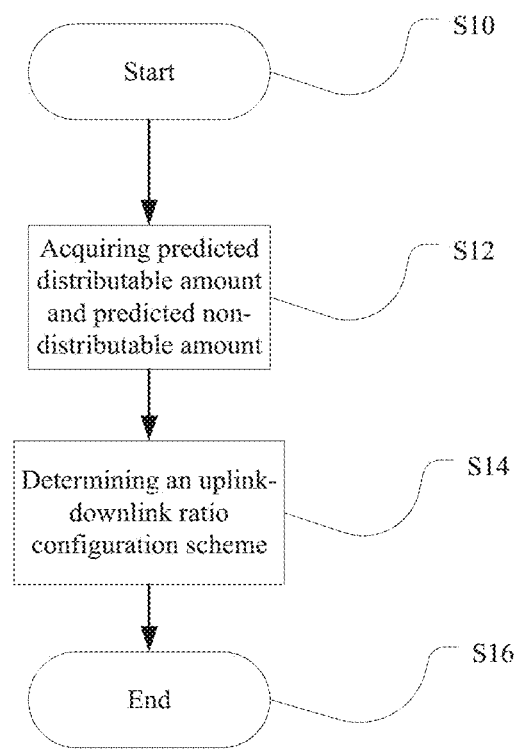
FIG. 1 is a flowchart illustrating a communication method for a wireless communication network according to an embodiment of the present application.

2. The apparatus for adjusting an uplink-downlink ratio configuration scheme of a cell cluster in a wireless communication network and the wireless communication system 3. Hardware configuration example 1. The Communication Method for the Wireless Communication Network FIG. 1 illustrates a flowchart of a communication method for a wireless communication network according to an embodiment of the present application. In the wireless communication network, at least one cell cluster is included. Cells in each cell cluster have a same communication frequency and a same uplink-downlink ratio configuration scheme.

Figure 2:
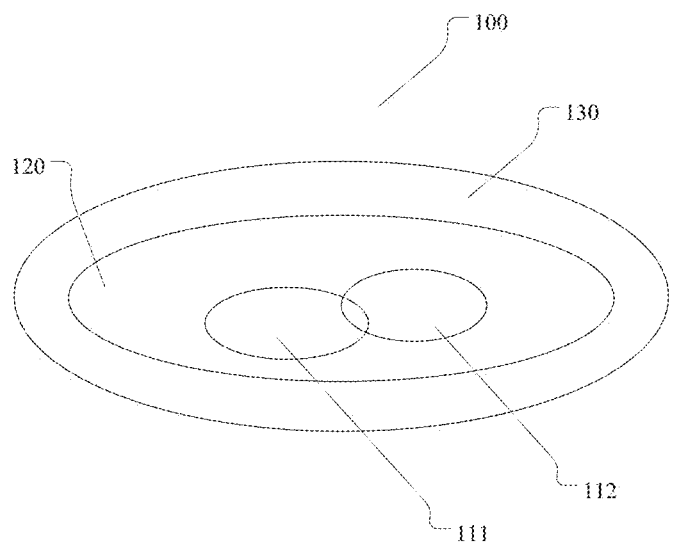
FIG. 2 is a schematic drawing of a wireless communication network to which a communication method for the wireless communication network according to an embodiment of the present application is applied.

The wireless communication network is, for example, the wireless communication network 100 shown in FIG. 2. The wireless communication network includes three cell clusters. The first cell cluster includes a cell 111 and a cell 112, and has a first communication frequency. The second cell cluster includes only a cell 120, and has a second communication frequency. The third cell cluster includes only a cell 130, and has a third communication frequency. The frequency point of the first communication frequency is higher than that of the second communication frequency, and the frequency point of the second communication frequency is higher than that of the third communication frequency. To be noted, the wireless communication network 100 can also include another number of cell clusters, for example, only one cell cluster. In addition, the number of cells in each cell cluster can be one or more.

In the following, the communication method for the wireless communication network according to the embodiment of the present application will be described with reference to FIG. 1.

In step S10, processing is started, and proceeds to step S12.

In step S12, with respect to one cell cluster of the at least one cell cluster included in the wireless communication network 100, a predicted non-distributable amount of non-distributable service of each cell in that cell cluster, and a predicted distributable amount of service of each cell in that cell cluster which is able to be distributed with other cells are acquired, and processing proceeds to step S14.

As shown in FIG. 1, since coverage ranges of cells may overlap with one another, service of mobile terminals located in the overlapped coverage range may be distributed among different cells. It is to be noted that it is not the case when a mobile terminal of one cell is located in the coverage range of another cell at the same time, the service of the mobile terminal can be distributed between the two cells, factors such as whether the mobile terminal supports the communication mode of the other cell are required to be considered as well.

In addition, although the processing is described only with respect to one cell cluster here, those skilled in the art can understand that the processing can also be performed to all or part of cell clusters included in the wireless communication network 100.

In step S14, with the above mentioned cell cluster, based on the acquired predicted non-distributable amount and predicted distributable amount of each cell in the cell cluster, an uplink-downlink ratio configuration scheme of that cell cluster within a next ratio configuration adjusting period is determined in order to optimize the utilization efficiency of communication resources, and processing proceeds to step S16 and end.

Preferably, when determining the uplink-downlink ratio configuration scheme of that cell cluster for the next ratio configuration adjusting period, it can be further implemented based on a relationship between the predicted distributable amount of each cell in that cell cluster and the service amount which is able to be carried by that cell under each candidate uplink-downlink ratio configuration scheme. Those skilled in the art can understand that other appropriate factors can serve as the basis for determining the uplink-downlink ratio configuration scheme of that cell cluster for the next ratio configuration adjusting period.

When determining based on the predicted non-distributable amount of each cell in that cell cluster and the relationship between the predicted distributable amount of each cell in that cell cluster and the service amount which is able to be carried by that cell under each candidate uplink-downlink ratio configuration scheme, an optional manner is to determine the uplink-downlink ratio configuration scheme, so that a weighted sum of an non-distributable sample amount and a distributable sample amount of each cell in that cell cluster for the next ratio scheme adjusting period is maximum under that uplink-downlink ratio configuration scheme. When the maximum throughput which can be provided by each cell in that cell cluster is larger than or equal to a sum of the predicted non-distributable amount and predicted distributable amount of this cell in the next ratio configuration adjusting period under the uplink-downlink ratio configuration scheme, the non-distributable sample amount and distributable sample amount of this cell in the next ratio configuration adjusting period are equal to the predicted non-distributable amount and predicted distributable amount of this cell respectively. When the maximum throughput which can be provided by each cell in that cell cluster is smaller than a sum of the predicted non-distributable amount and predicted distributable amount of this cell in the next ratio configuration adjusting period under the uplink-downlink ratio configuration scheme, the non-distributable sample amount and distributable sample amount of this cell in the next ratio configuration adjusting period are smaller than or equal to the predicted non-distributable amount and predicted distributable amount of this cell respectively. The specific definition of the non-distributable sample amount and distributable sample amount of this cell in the cell cluster in the next ratio configuration adjusting period will be described later in the Description.

The non-distributable sample amount of each cell in that cell cluster is a portion of the predicted non-distributable amount of that cell which will be carried by that cell under the scheme, and can have a first weight. The distributable sample amount of each cell in that cell cluster is a portion of the predicted distributable amount of that cell which will be carried by that cell under the scheme, and can have a second weight which is smaller than the first weight. The first weight is larger than the second weight, because when considering the allocation of various services among cells, compared with services which can be distributed with other cells, services which can be carried only by the present cell should have higher priority level.

As for the specific values of the first weight and the second weight, those skilled in the art can set properly according to design requirements and actual situation, and the details will be omitted here. In addition, in a particular situation, for example, in a situation where the predicted distributable amount has a higher priority level than the predicted non-distributable amount, the first weight can be set to be smaller than the second weight. Therefore, those skilled in the art can properly set the relationship between the first weight and the second weight according to design requirements and actual situation.

In addition, although the non-distributable sample amount and the distributable sample amount are defined as the portion of the predicted non-distributable amount and the predicted distributable amount in the next ratio configuration adjusting period which will be carried by the cell in the cell cluster respective, in fact, the distribution among the cells will be implemented according to the actual situation, rather than necessarily according to the distributable sample amount, in the next ratio configuration adjusting period. This is because the distributable sample amount is only the predication for the service to be occurred in the next ratio configuration adjusting period. As for the non-distributable sample amount, the similar situation also exists.

In particular, the predicted distributable amount of each cell in that cell cluster can include at least one of a predicted intra-frequency distributable amount of service of each cell in that cell cluster which is able to be distributed with neighboring cells in that cell cluster and a predicted inter-frequency distributable amount of service of each cell in that cell cluster which is able to distributed with inter-frequency cells outside that cell cluster. In other words, the predicted distributable amount of each cell in that cell cluster can only include the predicted intra-frequency distributable amount of each cell in that cell cluster, can only include the predicted inter-frequency distributable amount of each cell in that cell cluster, or can include the two as well.

To be noted, since a distance between cells belonging to different cell clusters under the same communication frequency is generally long and the coverage ranges thereof generally do not overlap with each other, the distribution of service among the cell and identical frequency cells belonging to different cell clusters can not be considered.

The predicted inter-frequency distributable amount of each cell in that cell cluster can include the predicted inter-frequency distributable amount of service distributed from an superordinate cell of that cell. The superordinate cell is a cell of which the communication frequency point is lower than that of that cell and the service coverage overlaps with that cell. For example, when the cell cluster which the cell 120 belongs to in FIG. 2 is involved, cell 130 is an superordinate cell of the cell 120. Similarly, when the cell cluster which the cells 111 and 112 belong to is involved, cell 120 is an superordinate cell of the cells 111 and 112. In addition, cell 130 is also an superordinate cell of the cells 111 and 112.

During the actual distribution, the direction of distribution of service among each cell in the cell cluster and the superordinate cells of each cell can be bi-directional, i.e., service can be distributed from this cell to its superordinate cell and can be distributed from the superordinate cell to this cell as well. However, on one hand, since it is more common to distribute service from a cell with a lower frequency point of communication frequency and a larger coverage area to a cell with a higher frequency point of communication frequency and a smaller coverage area, on the other hand, to facilitate the description of the distributed service, the distribution of service in the embodiments of the present application is performed from a lower frequency cell to a higher frequency cell. Of course, those skilled in the art can easily derive a technical solution based on an opposite direction of service distribution in accordance with the concept of the present application.

Similarly, the predicted inter-frequency distributable amount of each cell in that cell cluster can further include the predicted inter-frequency distributable amount of service of each cell in that cell cluster which is able to be distributed to a lower cell of that cell. The lower cell is a cell of which the communication frequency point is higher than that of that cell and the service coverage overlaps with that cell. For example, when the cell cluster which the cell 120 belongs to in FIG. 2 is involved, cells 111 and 112 are lower cells of the cell 120. Similarly, when the cell cluster which the cell 130 belongs to is involved, cell 120 is the lower cell of the cell 130.

Considering the predicted intra-frequency distributable amount and predicted inter-frequency distributable amount, an optional manner is to make a weighted sum of the non-distributable sample amount, the distributable intra-frequency sample amount and the distributable inter-frequency sample amount of each cell in that cell cluster for the next ratio configuration adjusting period be maximum under the determined uplink-downlink ratio configuration scheme. When the maximum throughput which can be provided by each cell in that cell cluster is larger than or equal to a sum of the predicted non-distributable amount, the predicted intra-frequency distributable amount and the predicted inter-frequency distributable amount of this cell in the next ratio configuration adjusting period under the uplink-downlink ratio configuration scheme, the non-distributable sample amount, the distributable intra-frequency sample amount and the distributable inter-frequency sample amount of this cell in the next ratio configuration adjusting period are equal to the predicted non-distributable amount, the predicted intra-frequency distributable amount and the predicted inter-frequency distributable amount of this cell respectively. When the maximum throughput which can be provided by each cell in that cell cluster is smaller than the sum of the predicted non-distributable amount, the predicted intra-frequency distributable amount and the predicted inter-frequency distributable amount of this cell in the next ratio configuration adjusting period under the uplink-downlink ratio configuration scheme, the non-distributable sample amount, the distributable intra-frequency sample amount and the distributable inter-frequency sample amount of this cell in the next ratio configuration adjusting period are smaller than or equal to the predicted non-distributable amount, the predicted intra-frequency distributable amount and the predicted inter-frequency distributable amount of this cell respectively. The specific definition of the distributable intra-frequency sample amount and the distributable inter-frequency sample amount of this cell in the cell cluster in the next ratio configuration adjusting period will be described later in the Description.

The distributable intra-frequency sample amount of each cell in that cell cluster is a portion of the predicted intra-frequency distributable amount of that cell which will be carried by that cell under the scheme, and can have a third weight. The distributable inter-frequency sample amount of each cell in that cell cluster is a portion of the predicted inter-frequency distributable amount of that cell which will be carried by that cell under the scheme, and can have a fourth weight. The first weight can be set to be larger than the third weight, and the third weight can be set to be larger than the fourth weight. The reason for such settings is that when considering allocation of various services among cells, services which can only be carried by the present cell have the highest priority level, services which can be distributed with the identical frequency cells belonging to the same cell cluster have the second highest priority level, and services which are distributed from the superordinate cells generally have a lower priority than the previous two.

The specific values of the first weight, the third weight and the fourth weight and the relationship among them can be proper set by those skilled in the art according to design requirements and actual situation as well.

In addition, preferably, taking the situation where the uplink service and downlink service have different priority levels into consideration, an uplink portion and a downlink portion among the non-distributable sample amount, the distributable intra-frequency sample amount and the distributable inter-frequency sample amount of each cell in that cell cluster can be allocated with corresponding weights respectively. In the situation of requiring considering the downlink service more, the weight of the downlink portion can be set higher than the weight of the uplink portion, vice versa. In addition, the weight of the uplink service and the weight of the downlink service can be not preset manually either, but be dynamically determined according to the actual service status of each cell in the cell cluster. For example, the weight of the uplink service and the weight of the downlink service can be set according to the ratio of the uplink portion to the downlink portion in the predicted distributable amount and predicted non-distributable amount of each cell. When the uplink service occupies a larger proportional in the predicted distributable amount and predicted non-distributable amount of each cell, it can be regarded that the uplink service in this cell cluster is more important, and a higher weight is set for the uplink service portion correspondingly, vice versa.

In addition, when setting the weight, a uniform weight can be set for cells in the whole cell cluster, or weights can be set separately based on the situation of each cell. It is also possible to set different weights for different services according to their importance, so that the important service can be considered first. It is also possible to set weights based on the fact whether the distributed service is from a cell with heavy load, so that the service from a cell with heavy load is distributed first.

Figure 3:
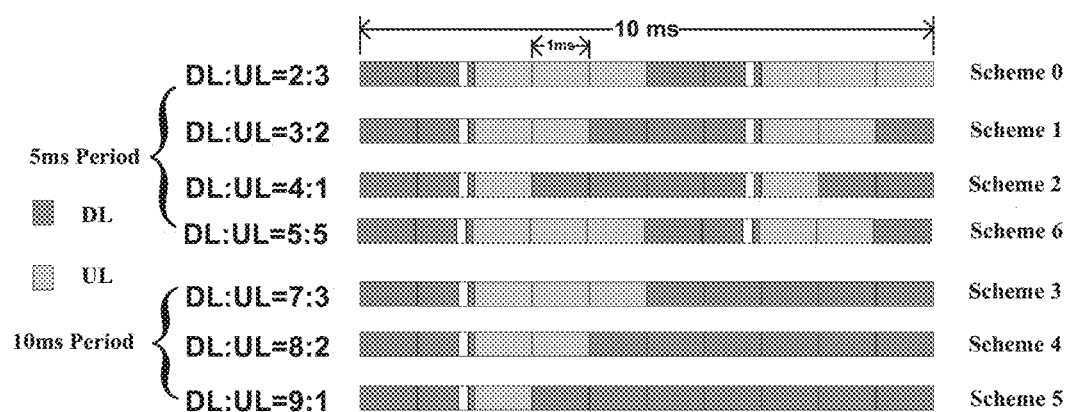
FIG. 3 is a schematic drawing of optional uplink-downlink ratio configuration schemes in a TD-SCDMA (Time Division-Synchronous Code Division Multiple Access)/LTE TDD (Long Term Evolution Time Division duplexing) system.

When determining the uplink-downlink ratio configuration scheme of the cell cluster in the next ratio configuration adjusting period, selection can be made in a predetermined set of uplink-downlink ratio configuration schemes. For example, in the TD-SCDMA/LTE TDD system, selection can be made among the seven uplink-downlink ratio configuration schemes (that is, scheme 0 to scheme 6) shown in FIG. 3 at a period of 10 ms. To those skilled in the art, the uplink-downlink ratio configuration scheme can be selected properly according to other manners, and will not be described in detail here.

After determining the uplink-downlink ratio configuration scheme of that cell cluster for the next ratio configuration adjusting period based on the predicted non-distributable amount, the predicted intra-frequency distributable amount of each cell in the cell cluster and the predicted inter-frequency distributable amount of each cell in that cell cluster with other cells, a transmitting power adjusting scheme of each cell in that cell cluster for the next ratio configuration adjusting period is determined.

Specifically, after determining the uplink-downlink ratio configuration scheme of that cell cluster for the next ratio configuration adjusting period, the distributable inter-frequency sample amount to be carried by each cell in the cell cluster in the next ratio configuration adjusting period is also determined. Therefore, it can be determined whether it is necessary to adjust the transmitting power of the cell. If the cell is to carry the distributed service more in the next ratio configuration adjusting period, the transmitting power of the cell can be increased properly, so as to increase the coverage area of the cell and improve the quality of service which the cell provides for the mobile terminals located in the coverage range where the cell and the superordinate cell overlaps. On the contrary, if the cell is to carry the distributed service less or to carry the distributed service in the next ratio configuration adjusting period, the transmitting power of the cell can be decreased properly, so as to save energy. Of course, under proper situations, the transmitting power of the cell can be maintained without any change.

In addition, to be noted, as for the cells in the cell cluster which has the lowest frequency point of communication frequency and the largest coverage range, it is generally not required to adjust the transmitting power thereof.

In addition, after determining the uplink-downlink ratio configuration scheme for one cell cluster in step S14, processing can not proceed to step S16, but return to step S12, and processing is continued with respect to the cell clusters to which the superordinate cells of each cell in that cell cluster belongs.

For example, after processing is performed with respect to the cell cluster which the cells 111 and 112 belong to in the wireless communication network 100, processing can be performed with respect to the cell cluster the cell 120 belonging to subsequently, or processing can be performed with respect to the cell cluster the cell 130 belonging to subsequently.

In addition, after processing is performed with respect to the cell cluster which the cell 120 belongs to in the wireless communication network 100, processing can be performed with respect to the cell cluster the cell 130 belonging to subsequently.

To be noted, when processing with respect to subsequent cell clusters, the uplink-downlink ratio configuration scheme determined with respect to previous cell clusters can be considered to prevent repeated calculation of the predicted inter-frequency distributable amount between cells of different frequencies. In particular, for example, the uplink-downlink ratio configuration scheme of the cell cluster for the next ratio configuration adjusting period can be determined based on the predicted non-distributable amount of each cell in the subsequent cell cluster, the predicted intra-frequency distributable amount of each cell in the subsequent cell cluster, the predicted inter-frequency distributable amount between each cell in the subsequent cell cluster and its superordinate cells, the predicted inter-frequency distributable amount between each cell in the subsequent cell cluster and its lower cells, wherein, the distributable inter-frequency sample amount between each cell in the subsequent cell cluster and the cell in the cell cluster of which the uplink-downlink ratio configuration scheme has been determined is subtracted from the distributable inter-frequency sample amount between each cell in the subsequent cell cluster and its lower cells.

Therefore, if to determine the uplink-downlink ratio configuration schemes with respect to a plurality of cell clusters, processing can be started from a cell cluster with the highest frequency point of communication frequency. In addition, in the wireless communication network, not only the cell clusters whose uplink-downlink ratio configuration scheme can be adjusted (for example, the cells in such a cell cluster operates in TDD manner) but also the cell clusters whose uplink-downlink ratio configuration scheme can not be adjusted (for example, the cells in such a cell cluster operates in FDD (frequency division duplexing) manner) may be included. Generally, the cells in the cell cluster with the lowest frequency point of communication frequency in the wireless communication network operate in FDD manner. As for a cell cluster whose uplink-downlink ratio configuration scheme can not be adjusted, it is possible to consider, when processing with respect to another cell cluster, the predicted inter-frequency distributable amount with the cells in the cell cluster, but not perform determination of the uplink-downlink ratio configuration scheme with respect to the cell cluster.

To be noted, those skilled in the art can also set other processing orders, for example, an order starting the processing from a cell cluster with the lowest frequency point of the communication frequency, or other proper orders.

In the following, the method for adjusting the uplink-downlink ratio configuration scheme of a cell cluster included in the wireless communication network 100 will be described in detail, taking the wireless communication network 100 in FIG. 2 as an example.

First of all, the uplink-downlink ratio configuration scheme of a cell cluster with the highest frequency point of communication frequency, i.e., the cell cluster to which cells 111 and 112 belong and which has a first communication frequency, is determined.

With respect to the cell 111, its predicted non-distributable amount a(111) and its predicted distributable amount b(111) are acquired.

To be noted, b(n) here denotes the predicted distributable amount flowing into the cell n, wherein n is a number of the cell.

With respect to the cell 112, its predicted non-distributable amount a(112) and its predicted distributable amount b(112) are acquired.

Subsequently, with respect to the whole cell cluster, the weighted sum of the non-distributable sample amount $A_i(111)$ and the distributable sample amount $B_i(111)$ of the cell 111 as well as the non-distributable sample amount $A_i(112)$ and the distributable sample amount $B_i(112)$ of the cell 112 is calculated under the uplink-downlink ratio configuration scheme i.

Assuming the first weight for the non-distributable sample amount is w1, the second weight for the distributable sample amount is w2, the weighted sum of the non-distributable sample amount and distributable sample amount in this cell cluster is $x_i$, the total service amount which can be provided by the cell 111 under the uplink-downlink ratio configuration scheme i is $R_i(111)$, the total service amount which can be provided by the cell 112 is $R_i(112)$, the following equation stands:

$$\text{Max } x_i = w1 \cdot \sum_{n=111}^{112} A_i(n) + w2 \cdot \sum_{n=111}^{112} B_i(n) \quad (1)$$

$$A_i(n) \leq a(n) \quad n = 111, 112$$

$$B_i(n) \leq b(n) \quad n = 111, 112$$

$$A_i(n) + B_i(n) \leq R_i(n) \quad n = 111, 112$$

For each uplink-downlink ratio configuration scheme i, there can be derived a maximum weighted value max $x_i$. The value of i which makes max $x_i$ the maximum is determined, and the corresponding uplink-downlink ratio configuration scheme i is determined as the uplink-downlink ratio configuration scheme of this cell cluster in the next ratio configuration adjusting period.

To be noted, since the predicted distributable amount, the predicted non-distributable amount, the distributable sample amount, the non-distributable sample amount, the total service amount which can be provided by the cell each actually includes components of uplink and downlink, these amounts are actually one dimensional vector. Correspondingly, the first weight w1 and the second weight w2 are also one dimensional vectors (that is, the weight for the uplink weight and the weight for the downlink weight can be the same or different). The weighted sum $x_i$ is a scalar.

More particularly, the predicted distributable amount b(111) of the cell 111 includes the predicted intra-frequency distributable amount b(111, 112) between the cell 111 and the cell 112, the predicted inter-frequency distributable amount b(111, 120) between the cell 111 and its superordinate cell 120, and the predicted inter-frequency distributable amount b(111, 130) between the cell 111 and its superordinate cell 130.

To be noted, b(m, n) here represents the predication amount of service distributed from the cell n to the cell m, wherein, m and n are numbers of the cells. Therefore, obviously, b(m, n)=−b(n, m), and b(m, m)=0.

Similarly, the predicted distributable amount b(112) of the cell 112 includes the predicted intra-frequency distributable amount b(112, 111) between the cell 112 and the cell 111, the predicted inter-frequency distributable amount b(112, 120) between the cell 112 and its superordinate cell 120, and the predicted inter-frequency distributable amount b(112, 130) between the cell 111 and its superordinate cell 130.

With respect to the whole cell cluster, the weighted sum of the non-distributable sample amount $A_i$(111) of the cell 111, the distributable intra-frequency sample amount $B_i$(111, 112) of the cell 111, the distributable inter-frequency sample amount $B_i$(111, 120) and $B_i$(111, 130) between the cell 111 and its superordinate cells 120 and 130, as well as the non-distributable sample amount $A_i$(112) of the cell 112, the distributable intra-frequency sample amount $B_i$(112, 111) of the cell 112, the distributable inter-frequency sample amount $B_i$(112, 120) and $B_i$(112, 130) between the cell 112 and its superordinate cells 120 and 130 is calculated under the uplink-downlink ratio configuration scheme i.

To be noted, $B_i$(m, n) here represents the sample amount of service to be carried by the cell n in the next ratio configuration adjusting period which is distributed from the cell m, wherein, m and n are numbers of the cells. Therefore, obviously, $B_i$(m, n)=−$B_i$(n, m), and $B_i$(m, m)=0.

Assuming the first weight for the non-distributable sample amount is w1, the third weight for the distributable intra-frequency sample amount is w3, the fourth weight for the distributable inter-frequency sample amount between the cell and its superordinate cell is w4, the weighted sum of the non-distributable sample amount, the distributable intra-frequency sample amount and the distributable inter-frequency sample amount between the cell and its superordinate cell in this cell cluster is $x_i$, the total service amount which can be provided by the cell 111 under the uplink-downlink ratio configuration scheme i is $R_i$(111), the total service amount which can be provided by the cell 112 is $R_i$(112), the following equation stands:

$$\text{Max } x_i = \quad (2)$$

$$w1 \cdot \sum_{n=111}^{112} A_i(n) + w3 \cdot \sum_{n=111}^{112} \sum_{m=111}^{112} B_i(n, m) + w4 \cdot \sum_{n=111}^{112} \sum_{m=120}^{130} B_i(n, m)$$

$$A_i(n) \leq a(n) \; n = 111, 112$$

$$B_i(n, m) \leq b(n, m) \; n = 111, 112, m = 111, 112, 120, 130$$

$$A_i(n) + \sum_{m=111}^{112} B_i(n, m) + \sum_{m=120}^{130} B_i(n, m) \leq R_i(n) \; n = 111, 112$$

Similarly, since the predicted non-distributable amount, the predicted intra-frequency distributable amount, the predicted inter-frequency distributable amount between the cell and its superordinate cell, the non-distributable sample amount, the distributable intra-frequency sample amount, the distributable inter-frequency sample amount between the cell and its superordinate cell, and the total service amount which can be provided by the cell each actually is a one dimensional vector including uplink component and downlink component, correspondingly, the first weight w1, the third weight w3 and the fourth weight w4 are also one dimensional vectors (that is, the weight for the uplink weight and the weight for the downlink weight can be the same or different). The weighted sum $x_i$ is a scalar.

In addition, to be noted, since b(m, n)=−b(n, m), and b(m, m)=0 stand, in the situation where the weight is the same for each cell, the value of the item $$\text{``}\sum_{n=111}^{112} \sum_{m=111}^{112} B_i(n, m)\text{''}$$

in equation (2) is constant 0. However, those skilled in the art can understand that the value of this item may be not constant 0 in the situation that each cell has different weights.

After determining the uplink-downlink ratio configuration scheme i1 for the cell cluster which the cells 111 and 112 belongs to, the uplink-downlink ratio configuration scheme can be provided to the cells 111 and 112 of the cell cluster. In addition, transmitting power of the cells 111 and 112 can further be adjusted corresponding to the uplink-downlink ratio configuration scheme, if necessary. The predicted inter-frequency distributable amount corresponding to the uplink-downlink ratio configuration scheme i1 can be further provided to the superordinate cells 120 and 130 of the cells 111 and 112.

Subsequently, the uplink-downlink ratio configuration scheme can be determined for a cell cluster with the second highest frequency point of communication frequency, i.e., the cell cluster which the cell 120 belongs to.

First of all, with respect to the cell 120, its predicted non-distributable amount a(120) and its predicted distributable amount b(120) are acquired. Since this cell cluster just includes one cell 120, there is no predicted intra-frequency distributable amount for the cell 120. The predicted distributable amount b(120) of the cell 120 only includes the predicted inter-frequency distributable amount b(120, 130) between the cell 120 and its superordinate cell 130, and the predicted inter-frequency distributable amount b(120, 111) and b(120, 112) between the cell 120 and its lower cells 111 and 112. To be stated, the predicted inter-frequency distributable amount b(120, 130) between the cell 120 and its superordinate cell 130 is acquired by the cell 130 based on the distributable inter-frequency sample amount $B_{i1}$(111, 130) and $B_{i1}$(112, 130) between the cells 111, 112 and the cell 130, which is corresponding to the uplink-downlink ratio configuration scheme i1 of the cell cluster which the cells 111 and 112 belong to.

Since the uplink-downlink ratio configuration scheme i1 has been determined with respect to the cell cluster which the cells 111 and 112 belong to, a portion of the predicted inter-frequency distributable amount b(120, 111) and b(120, 112) of service distributed from the cell 120 to its lower cells 111 and 112 will be carried by the lower cells 111 and 112 in the next ratio configuration adjusting period (that is, $$\sum_{n=111}^{112} B_{i1}(n, 120)).$$

Therefore, when considering the superordinate limit of the distributable inter-frequency sample amount $B_i$(120, 111) and $B_i$(120, 112) between the cell 120 and its lower cells 111, 112, this portion should be removed from the predicted inter-frequency distributable amount between the cell 120 and its lower cells 111, 112.

With respect to the whole cell cluster, the weighted sum of the non-distributable sample amount $A_i$(120) of the cell 120, the distributable inter-frequency sample amount $B_i$(120, 111) and $B_i$(120, 112) between the cell 120 and its lower cells 111 and 112, as well as the distributable inter-frequency sample amount $B_i$(120, 130) between the cell 120 and its superordinate cell 130 is calculated under the uplink-downlink ratio configuration scheme i.

Assuming the first weight for the non-distributable sample amount is w1, the fourth weight for the distributable inter-frequency sample amount between the cell and its superordinate cell and its lower cell is w4, the weighted sum of the non-distributable sample amount and the distributable inter-frequency sample amount between the cell and its superordinate cell and its lower cell in this cell cluster is $x_i$, the total service amount which can be provided by the cell 120 under the uplink-downlink ratio configuration scheme i is $R_i$(120), the following equation stands:

$$\text{Max } x_i = w1 \cdot A_i(120) + w4 \cdot \sum_{m=111}^{112} B_i(120, m) + w4 \cdot B_i(120, 130) \quad (3)$$

$$A_i(120) \leq a(120)$$

$$B_i(120, m) \leq b(120, m) - B_{i1}(m, 120) \quad m = 111, 112$$

$$B_i(120, 130) \leq b(120, 130)$$

$$A_i(120) + \sum_{m=111}^{112} B_i(120, m) + B_i(120, 130) \leq R_i(120)$$

Similarly, since the predicted non-distributable amount, the predicted inter-frequency distributable amount between the cell and its superordinate cell and lower cell, the non-distributable sample amount, the distributable inter-frequency sample amount between the cell and its superordinate cell and lower cell, and the total service amount which can be provided by the cell each actually is a one dimensional vector including uplink component and downlink component, correspondingly, the first weight w1, and the fourth weight w4 are also one dimensional vectors (that is, the weight for the uplink weight and the weight for the downlink weight can be the same or different). The weighted sum $x_i$ is a scalar.

It is to be understood that, in this example, the weight for the distributable inter-frequency sample amount between the cell and its superordinate cell is equal to the weight for the distributable inter-frequency sample amount between the cell and its lower cell, but those skilled in the art can set different weights according to actual situation and design requirements.

In addition, since this cell cluster includes only one cell, the predicted intra-frequency distributable amount and the distributable intra-frequency sample amount are not involved in the processing with respect to this cell cluster, and summation operation among multiple cells is not implemented either. Those skilled in the art can understand that, when there are multiple cells in the cell cluster, the processing to be implemented is similar.

After determining the uplink-downlink ratio configuration scheme i2 for the cell cluster which to cell 120 belongs to, the uplink-downlink ratio configuration scheme can be provided to the cell 120 of the cell cluster. In addition, the transmitting power of the cell 120 can be adjusted corresponding to the uplink-downlink ratio configuration scheme if necessary.

Subsequently, the uplink-downlink ratio configuration scheme can be determined with respect to the cell cluster with the lowest frequency point of the communication frequency, that is, the cell cluster which the cell 130 belongs to.

First, with respect to the cell 130, its predicted non-distributable amount a(130) and its predicted distributable amount b(130) are acquired. Since this cell cluster just includes one cell 130, there is no predicted intra-frequency distributable amount for the cell 130. The predicted distributable amount b(130) of the cell 130 only includes the predicted inter-frequency distributable amount b(130, 111), b(130, 112) and b(130, 120) between the cell 130 and its lower cells 111, 112 and 120.

Since the uplink-downlink ratio configuration schemes i1 and i2 have been determined with respect to the cell cluster which the cells 111 and 112 belong to and the cell cluster which the cell 120 belongs to respectively, a portion of the predicted inter-frequency distributable amount b(130, 111), b(130, 112) and b(130, 120) of service distributed from the cell 130 to its lower cells 111, 112 and 120 will be carried by the lower cells 111, 112 and 120 in the next ratio configuration adjusting period (that is, $$\sum_{n=111}^{112} B_{i1}(n, 130) + B_{i2}(120, 130)).$$

Therefore, when considering the superordinate limit of the distributable inter-frequency sample amount $B_i$(130, 111), $B_i$(130, 112) and $B_i$(130, 120) between the cell 130 and its lower cells 111, 112 and 120, this portion should be removed from the predicted inter-frequency distributable amount between the cell 130 and its lower cells 111, 112 and 120.

With respect to the whole cell cluster, the weighted sum of the non-distributable sample amount $A_i$(130) of the cell 130, as well as the distributable inter-frequency sample amount $B_i$(120, 111) and $B_i$(120, 112) between the cell 130 and its lower cell 111 is calculated under the uplink-downlink ratio configuration scheme i.

Assuming the first weight for the non-distributable sample amount is w1, the fourth weight for the distributable inter-frequency sample amount between the cell and its lower cell is w4, the weighted sum of the non-distributable sample amount and the distributable inter-frequency sample amount between the cell and its lower cell in this cell cluster is $x_i$, the total service amount which can be provided by the cell 130 under the uplink-downlink ratio configuration scheme i is $R_i(\mathbf{130})$, the following equation stands:

$$\text{Max } x_i = w1 \cdot A_i(130) + w4 \cdot \sum_{m=111,112,120} B_i(130, m) \quad (4)$$

$$A_i(130) \le a(130)$$

$$B_i(130, m) \le b(130, m) - B_{i1}(m, 130) \quad m = 111, 112, 120$$

$$A_i(130) + \sum_{m=111,112,120} B_i(130, m) \le R_i(130)$$

Similarly, since the predicted non-distributable amount, the predicted inter-frequency distributable amount between the cell and its lower cell, the non-distributable sample amount, the distributable inter-frequency sample amount between the cell and its lower cell, and the total service amount which can be provided by the cell each actually is a one dimensional vector including uplink component and downlink component, correspondingly, the first weight w1, and the fourth weight w4 are also one dimensional vectors (that is, the weight for the uplink weight and the weight for the downlink weight can be the same or different). The weighted sum $x_i$ is a scalar.

In addition, since this cell cluster includes only one cell, the predicted intra-frequency distributable amount and the distributable intra-frequency sample amount are not involved in the processing with respect to this cell cluster, and summation operation among multiple cells is not implemented either. Those skilled in the art can understand that, when there are multiple cells in the cell cluster, the processing to be implemented is similar.

After determining the uplink-downlink ratio configuration scheme i2 for the cell cluster which to cell 130 belongs to, the uplink-downlink ratio configuration scheme can be provided to the cell 130 of the cell cluster. In addition, the transmitting power of the cell 120 can be adjusted correspondingly to the uplink-downlink ratio configuration scheme if necessary.

Based on the above processing, a more generalized equation for determining the uplink-downlink ratio configuration scheme with respect to the k-th cell cluster (here, ranked in a descending order of the frequency point of communication frequency) can be obtained as follows:

$$\text{Max } x_i = w1 \cdot \sum_{n \in N(k)} A_i(n) + w3 \cdot \sum_{n \in N(k)} \sum_{m \in N(k)} B_i(n, m) + \quad (5)$$

$$w5 \cdot \sum_{n \in N(k)} \sum_{m \in U(k)} B_i(n, m) + w6 \cdot \sum_{n \in N(k)} \sum_{m \in D(k)} B_i(n, m)$$

$$A_i(n) \le a(n) \; n \in N(k)$$

$$B_i(n, m) \le b(n, m) - B_{i(m)}(m, n) \; m \in D(k)$$

$$B_i(n, m) \le b(n, m) \; m \in U(k)$$

$$\sum_{n \in N(k)} A_i(n) + \sum_{n \in N(k)} \sum_{m \in N(k)} B_i(n, m) +$$

-continued $$\sum_{n \in N(k)} \sum_{m \in U(k)} B_i(n, m) + \sum_{n \in N(k)} \sum_{m \in D(k)} B_i(n, m) \le R_i(n) \; n \in N(k)$$

Wherein, m and n denotes numbers of cells, N(k) represents a set of cell numbers of the k-the cell cluster, U(k) represents a set of numbers of superordinate cells of each cell in the k-th cell cluster, D(k) represents a set of numbers of superordinate cells of each cell in the k-th cell cluster, i(m) is a number of the uplink-downlink ratio configuration scheme determined for the cell cluster which the cell m belongs to. Obviously, as for the cell cluster k with the highest frequency point of communication frequency, D(k) is empty, and as for the cell cluster k with the lowest frequency point of communication frequency, U(k) is empty.

To be noted, not any one cell in the set U(k) is the superordinate cell of any one cell in the k-th cell cluster. Therefore, if n∈N(k) and m∈U(k), and the cell m is not the superordinate cell of the cell n, it is set that b(n, m)=0, and correspondingly $B_i$(n, m)=0. With respect to the set D(k), situation is similar.

In addition, besides the specification that the weight for the non-distributable sample amount is w1, and the weight for the distributable intra-frequency sample amount is w3, it is further specified that the weight for the distributable inter-frequency sample amount between the cell and its superordinate cell is w5 and the weight for the distributable inter-frequency sample amount between the cell and its lower cell is w6.

Those skilled in the art can understand, equation (5) can be applied to another wireless communication network different from the wireless communication network 100 shown in FIG. 2. The wireless communication network can include more than 3 cell clusters, and each cell cluster can include one or more cells.

Those skilled in the art can further modify equation (5) to get an even more generalized expression, when considering factors such as the importance of service, the importance of the cell, whether the distributed service comes from a cell with heavy load, and the like.

Besides the above mentioned manner, those skilled in the art can determine an uplink-downlink ratio configuration scheme for the cell cluster which maximizes the utilization efficiency of communication resources in other proper manners, which will not be described in detail here.

The multiple cell clusters can have the same communication frequency. However, since service distribution generally does not occur among cells with the same frequency but belonging to different cell clusters, the processing order among multiple cell clusters at the same frequency can be changed.

In addition, although each cell cluster is processed here in a descending order of frequency point of communication frequency, the processing can be performed in other appropriate orders.

Moreover, if the uplink-downlink ratio configuration scheme for a portion of cell clusters in the wireless communication network is not adjustable, processing can be not done to such cell clusters, which are "skipped".

In the above, how to determine the uplink-downlink ratio configuration scheme of the cell cluster in the wireless communication network for the next ratio configuration adjusting period is described. According to the above solution, the utilization efficiency of communication resources can be optimized.

In the procedure of actual distribution in the next ratio configuration adjusting period, the following principles can further be referred to:

1) The service distributed due to too heavy load is received preferentially.
2) if the receiving of the service distributed due to too heavy load may cause the total service amount of the present cell to exceed the service capability which can be provided by the present cell, but the amount exceeding the service capability which can be provided by the present cell is within a predetermined threshold range, this portion of service distributed due to too heavy load is still received.

By referring to the above mentioned principles, the performance of the wireless communication network can be optimized in the actual distribution.

2. The Apparatus for Adjusting an Uplink-Downlink Ratio Configuration Scheme of a Cell Cluster in a Wireless Communication Network FIG. 4 illustrates an apparatus 200 for adjusting an uplink-downlink ratio configuration scheme of a cell cluster in a wireless communication network according to an embodiment of the present application and the wireless communication system 300 according to an embodiment of the present application.

Figure 4:
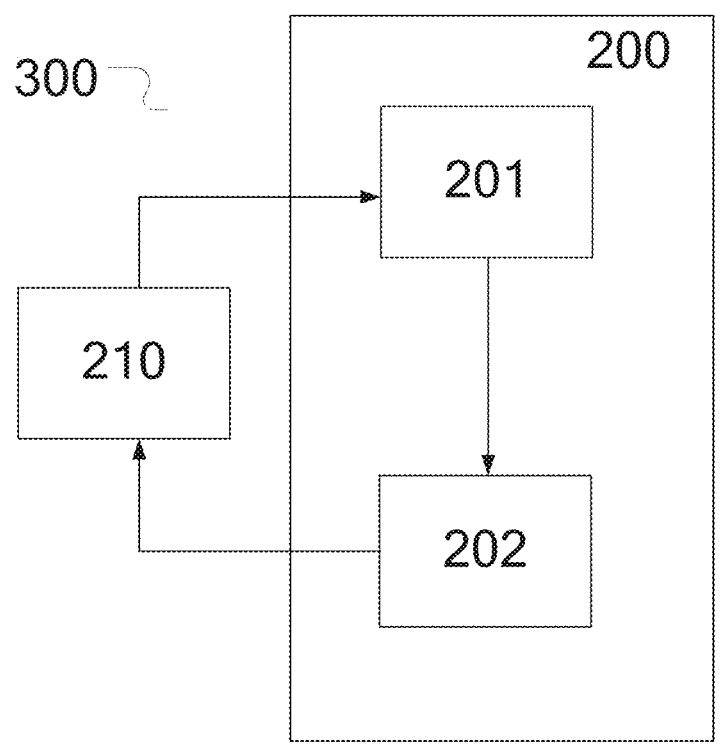
FIG. 4 is a block diagram illustrating an apparatus for adjusting an uplink-downlink ratio configuration scheme of a cell cluster in a wireless communication network according to an embodiment of the present application and the wireless communication system according to an embodiment of the present application.

As shown in FIG. 4, the wireless communication system includes the apparatus 200 and at least one cell cluster 210. The apparatus 200 includes a configuration unit 201 and a communication unit 202.

To be noted, the apparatus 200 can be provided separately from the base stations in the cell clusters, and can be provided in a base station in the cell clusters. In addition, a part of units of the apparatus 200 can be provided separately, while the other part of units is provided in one or more base stations. Alternatively, various parts of the apparatus 200 can be provided in one or more base stations.

The configuration unit 201 is configured to, with respect to one cell cluster in the wireless communication network 100, determine the uplink-downlink ratio configuration scheme of that cell cluster within a next ratio configuration adjusting period, based on a predicted non-distributable amount of non-distributable service of each cell in that cell cluster, and a predicted distributable amount of service of each cell in that cell cluster which is able to be distributed with other cells, in order to optimize the utilization efficiency of communication resources.

As stated above, the predicted distributable amount of each cell in that cell cluster can include at least one of a predicted intra-frequency distributable amount of service of each cell in that cell cluster which is able to be distributed with neighboring cells in that cell cluster and a predicted inter-frequency distributable amount of service of each cell in that cell cluster which is able to distributed with inter-frequency cells outside that cell cluster.

The predicted inter-frequency distributable amount of each cell in that cell cluster can include the predicted inter-frequency distributable amount of service distributed from an superordinate cell of that cell. The superordinate cell is a cell of which the communication frequency point is lower than that of that cell and the service coverage overlaps with that cell.

The configuration unit 201 can be further configured to, after determining the uplink-downlink ratio configuration scheme of that cell cluster for the next ratio configuration adjusting period, determine the uplink-downlink ratio configuration scheme of the cell cluster to which the superordinate cell of each cell in that cell cluster belongs, based on the determined uplink-downlink ratio configuration scheme.

The configuration unit 201 can be further configured to, according to the uplink-downlink ratio configuration scheme of that cell cluster for the next ratio configuration adjusting period, determine a transmitting power adjusting scheme of each cell in that cell cluster for the next ratio configuration adjusting period.

In other words, the configuration unit 201 can implement the processing of steps S12 and S14 in the foregoing communication method for the wireless communication network according to an embodiment of the present application, which will not be repeated here.

The communication unit 202 is configured to, with respect to that cell cluster, provide the determined uplink-downlink ratio configuration scheme of that cell cluster for the next ratio configuration adjusting period to a base station in that cell cluster. In particular, the communication unit 202 can provide the uplink-downlink ratio configuration scheme to the base station in the cell via an X2 interface or other proper interfaces. The communication unit can further provide the power adjusting scheme to the base station in the cell via the X2 interface or other proper interfaces.

Those skilled in the art can understand that the units for determining the uplink-downlink ratio configuration scheme or the power adjusting scheme can also be provided in the base station of each cell, so that it is not necessary to provide these schemes to the base station via the X2 interface and the like.

Figure 5:
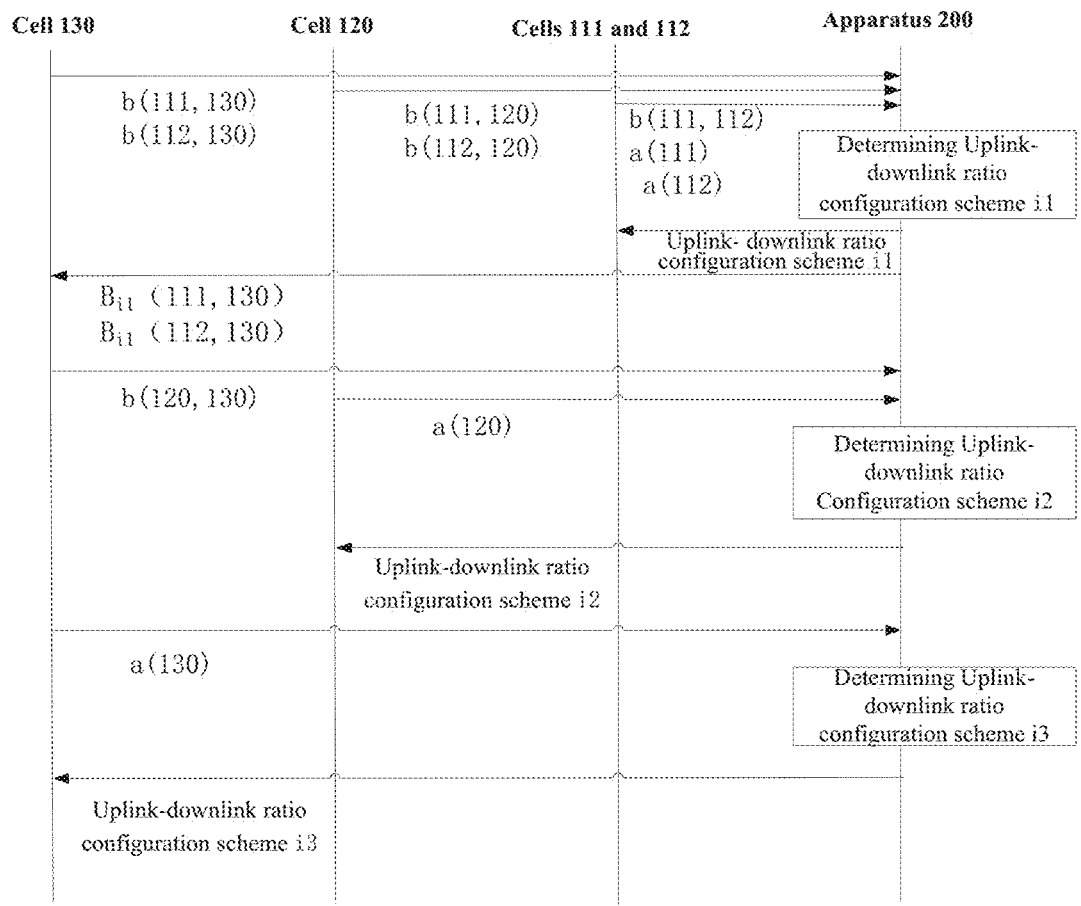
FIG. 5 is a schematic drawing illustrating interaction between the apparatus for adjusting an uplink-downlink ratio configuration scheme of a cell cluster in a wireless communication network according to an embodiment of the present application and a cell.

FIG. 5 is a schematic drawing illustrating interaction between the apparatus 200 and each cell in the wireless communication network 100. The apparatus 200 here is an apparatus independent from each cell in the wireless communication network 100.

First, the apparatus 200 acquires the predicted inter-frequency distributable amount b(111, 130) and b(112, 130) from the cell 130, acquires the predicted inter-frequency distributable amount b(111, 120) and b(112, 120) from the cell 120, and acquires the predicted intra-frequency distributable amount b(111, 112) and the predicted non-distributable amount a(111) and a (112) from the cells 111 and 112.

Subsequently, at the apparatus 200, the uplink-downlink ratio configuration scheme i1 is determined with respect to the cell cluster which the cells 111 and 112 belong to, and provided to the cells 111 and 112. In addition, it is further possible to determine the power adjusting schemes for cells 111 and 112 at the apparatus 200, and provide the same to the cells 111 and 112. It is also possible to determine respective power adjusting schemes at the cells 111 and 112. In addition, the distributable inter-frequency sample amount $B_{i1}(111, 130)$ and $B_{i1}(112, 130)$ corresponding to the uplink-downlink ratio configuration scheme i1 is provided to the cell 130.

Subsequently, at the apparatus 200, the predicted inter-frequency distributable amount b(120, 130) is acquired from the cell 130, and the predicted non-distributable amount a(120) is acquired from the cell 120.

Next, the uplink-downlink ratio configuration scheme i2 is determined with respect to the cell cluster which the cell 120 belongs to, and provided to the cell 120. In addition, it is further possible to determine the power adjusting schemes for the cell 120 at the apparatus 200, and provide the same to the cell 120. It is also possible to determine the power adjusting scheme for the cell 120 at the cell 120.

Subsequently, at the apparatus 200, the predicted non-distributable amount a(130) is acquired from the cell 130.

Finally, the uplink-downlink ratio configuration scheme i3 is determined with respect to the cell cluster which the cell 130 belongs to, and provided to the cell 130. In addition, it is further possible to determine the power adjusting schemes for the cell 130 at the apparatus 200, and provide the same to the cell 130. It is also possible to determine the power adjusting scheme for the cell 130 at the cell 130.

Figure 6:
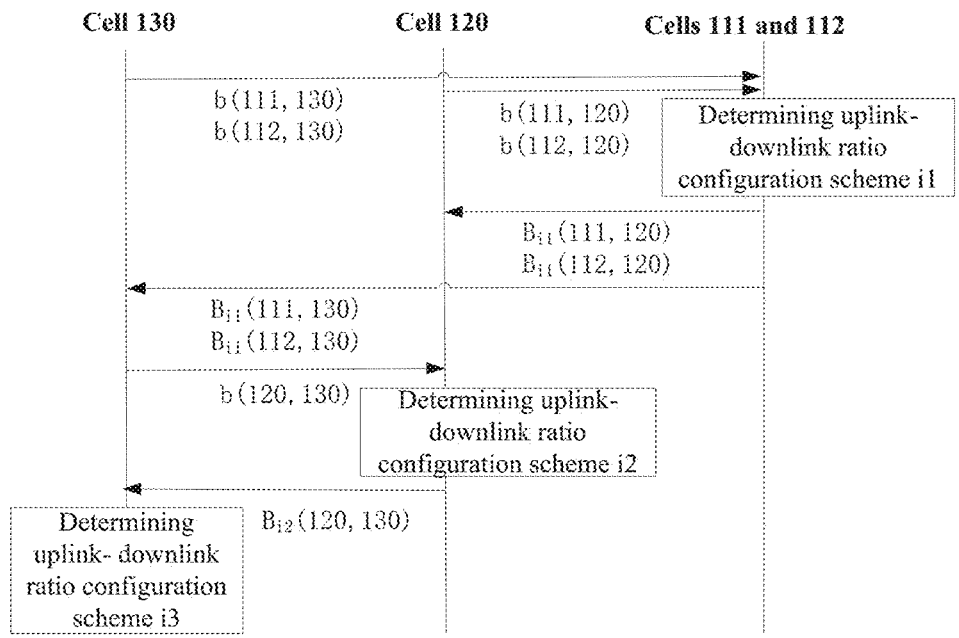
FIG. 6 a schematic drawing illustrating another example of interaction between the apparatus for adjusting an uplink-downlink ratio configuration scheme of a cell cluster in a wireless communication network according to an embodiment of the present application and a cell.

In addition, as shown in FIG. 6, the uplink-downlink ratio configuration scheme can further be determined in each cell cluster respectively. In this example, each unit of the apparatus 200 is distributed in base stations of each cell cluster. When there are multiple cells in the cell cluster, each unit of the apparatus 200 can be distributed in respective base station of the plurality of cells, or distributed only in the base station of one of the cells.

First, the unit of the apparatus 200 which is located in the cells 111 and 112 acquires the predicted inter-frequency distributable amount b(111, 130) and b(112, 130) from the cell 130, acquires the predicted inter-frequency distributable amount b(111, 120) and b(112, 120) from the cell 120, acquires the predicted intra-frequency distributable amount b(111, 112) and the predicted non-distributable amount a(111) and a(112) from the cells 111 and 112.

Next, the unit of the apparatus 200 which is located at the cells 111 and 112 determines the uplink-downlink ratio configuration scheme i1 with respect to the cell cluster which the cells 111 and 112 belong to, and can further determine the power adjusting schemes for the cells 111 and 112. In addition, the distributable inter-frequency sample amount $B_{i1}(111, 120)$ and $B_{i1}(112, 120)$ corresponding to the uplink-downlink ratio configuration scheme i1 is provided to the unit of the apparatus 200 which is located at the cell 120, and the distributable inter-frequency sample amount $B_{i1}(111, 130)$ and $B_{i1}(112, 130)$ corresponding to the uplink-downlink ratio configuration scheme i1 is provided to the unit of the apparatus 200 which is located at the cell 130.

Next, the unit of the apparatus 200 which is located at the cell 120 acquires the predicted inter-frequency distributable amount b(120, 130) from the cell 130, and acquires the predicted non-distributable amount a(120) from the cell 120.

Next, the unit of the apparatus 200 which is located at the cell 120 determines the uplink-downlink ratio configuration scheme i2 with respect to the cell cluster which the cell 120 belongs to, and can further determine the power adjusting scheme for the cell 120. In addition, the distributable inter-frequency sample amount $B_{i1}(120, 130)$ corresponding to the uplink-downlink ratio configuration scheme i2 is provided to the unit of the apparatus 200 which is located at the cell 130.

Next, the unit of the apparatus 200 which is located at the cell 130 acquires the predicted non-distributable amount a(130) from the cell 130.

Finally, the unit of the apparatus 200 which is located at the cell 130 determines the uplink-downlink ratio configuration scheme i3 with respect to the cell cluster which the cell 130 belongs to, and can further determine the power adjusting scheme for the cell 130.

The wireless communication system and the apparatus for adjusting the uplink-downlink ratio configuration scheme of the cell cluster in the wireless communication network according to embodiments of the present application have been described in the above. According to the wireless communication system and the apparatus, the utilization efficiency of communication resources can be optimized by adjusting the uplink-downlink ratio configuration scheme of the cell cluster.

3. Hardware Configuration Example

The constituent units and devices of the apparatus, system or base station according to embodiments of the invention as stated above can be implemented in hardware, firmware, software or any combination thereof. In the case where the present application is realized by software or firmware, a program constituting the software or firmware is installed in a computer with a dedicated hardware structure (e.g. the general computer 700 shown in FIG. 7) from a storage medium or network, wherein the computer is capable of implementing various functions of the above mentioned units and sub-units when installed with various programs.

Figure 7:
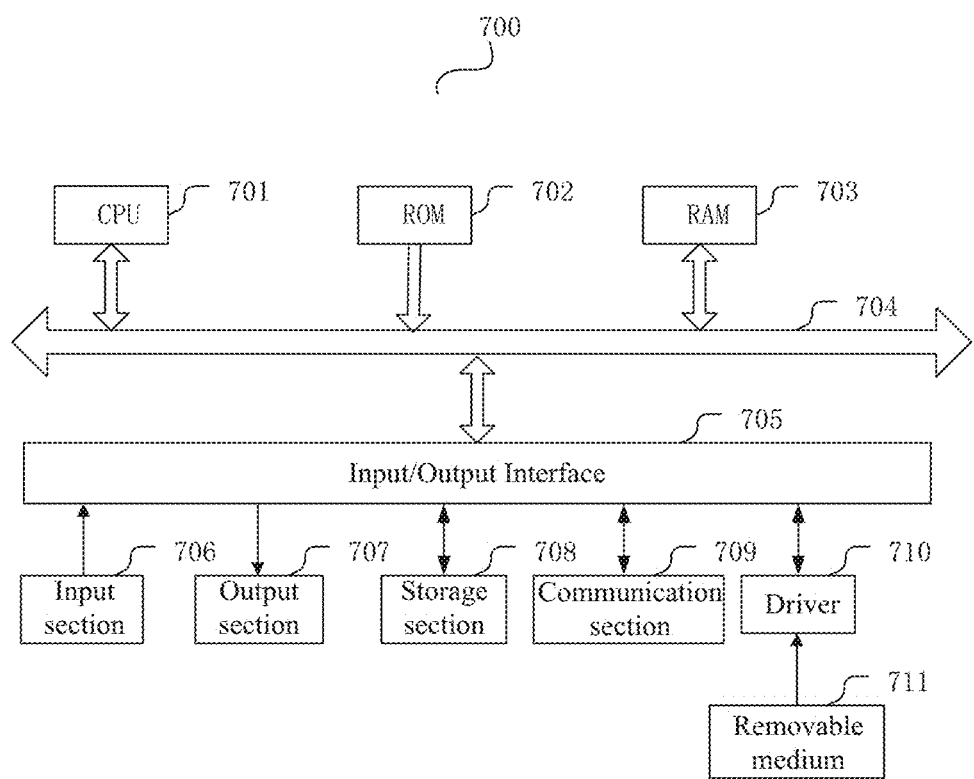
FIG. 7 is a schematic drawing illustrating an example of the hardware configuration according to an embodiment of the present disclosure.

In FIG. 7, a computing processing unit (CPU) 701 executes various processing according to a program stored in a read-only memory (ROM) 702 or a program loaded to a random access memory (RAM) 703 from a storage section 708. The data needed for the various processing of the CPU 701 may be stored in the RAM 703 as needed. The CPU 701, the ROM 702 and the RAM 703 are linked with each other via a bus 704. An input/output interface 705 is also linked to the bus 704.

The following components are linked to the input/output interface 705: an input section 706 (including keyboard, mouse and the like), an output section 707 (including displays such as a cathode ray tube (CRT), a liquid crystal display (LCD), a loudspeaker and the like), a storage section 708 (including hard disc and the like), and a communication section 709 (including a network interface card such as a LAN card, modem and the like). The communication section 709 performs communication processing via a network such as the Internet. A driver 710 may also be linked to the input/output interface 705, if needed. If needed, a removable medium 711, for example, a magnetic disc, an optical disc, a magnetic optical disc, a semiconductor memory and the like, may be installed in the driver 710, so that the computer program read therefrom is installed in the memory section 708 as appropriate.

In the case where the foregoing series of processing is achieved through software, programs forming the software are installed from a network such as the Internet or a memory medium such as the removable medium 711.

It should be appreciated by those skilled in the art that the memory medium is not limited to the removable medium 711 shown in FIG. 10, which has program stored therein and is distributed separately from the apparatus so as to provide the programs to users. The removable medium 711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 702 and the storage section 708 in which programs are stored, and can be distributed to users along with the device in which they are incorporated.

In addition, the present invention further discloses a program product in which machine-readable instruction codes are stored. The aforementioned methods according to the embodiments can be implemented when the instruction codes are read and executed by a machine. Accordingly, a memory medium for carrying the program product in which machine-readable instruction codes are stored is also covered in the present invention. The memory medium includes but is not limited to soft disc, optical disc, magnetic optical disc, memory card, memory stick and the like.

In addition, obviously, each operation procedure of the processing methods according to embodiments of the present invention can also be implemented in a manner of computer executable programs stored in various machine-readable storage mediums.

To be noted, the constituent units or devices of the apparatus, the system and base station according to embodiments of the present invention can be separate components, or one component implementing functions of several constituent units or devices.

Although the preferred embodiments of the invention have been described above, the embodiments as described above are merely illustrative but not limitative of the invention. Those skilled in the art can make various modifications, replacements, combinations or partial-combinations to the features in the above embodiments without departing from the scope of the invention. Therefore, the scope of the invention is defined merely by the appended claims.

The invention claimed is:

1. An electronic device that is part of a communication system including a cell cluster, the electronic device comprising:
    circuitry, configured to
    estimate a traffic amount for a cell in the cell cluster, the traffic amount to be offloaded from other cell(s) in the cell cluster, the communication system being a Time Division Duplex (TDD) communication system, the traffic amount to be offloaded is based on cell specific load information; and
    determine an uplink-downlink ratio configuration of the cell cluster, the uplink-downlink ratio configuration used by the cell based on the estimation, and
    the electronic device further comprises a transmitter configured to transmit the uplink-downlink ratio configuration to neighbor cells in the cell cluster via an X2 interface,
    wherein the circuitry is further configured to receive a predicted non-distributable amount of traffic.

2. The electronic device of claim 1, wherein the circuitry is further configured to determine a power control scheme to be used by the cell based on the estimation.

3. The electronic device of claim 1, wherein the traffic amount to be offloaded is from overloaded cell(s).

4. An electronic device that is part of a communication system including a cell cluster, comprising:
    circuitry configured to read and execute instructions from memory, and
    acquire a message from a control apparatus that is part of the communication system, the message comprising an uplink-downlink ratio configuration of the cell cluster, the uplink-downlink ratio configuration used for a next ratio configuration adjusting period,
    wherein the uplink-downlink ratio configuration for the next ratio configuration adjusting period is determined by
    an estimation of a traffic amount to be offloaded from other cell(s) to a cell, the cell and the other cell(s) are in the cell cluster, the communication system is a Time Division Duplex (TDD) communication system, the traffic amount to be offloaded is based on cell specific load information; and
    a determination of an uplink-downlink ratio configuration is used by the cell based on the estimation,
    wherein the circuitry is further configured to transmit a predicted non-distributable amount of traffic.

5. The electronic device of claim 4, wherein the circuitry is further configured to determine a power control scheme to be used by the cell based on the estimation.

6. The electronic device of claim 4, wherein the traffic amount to be offloaded is from overloaded cell(s).

7. The electronic device of claim 1, wherein one of the cells of the cell cluster is a superordinate cell.

8. The electronic device of claim 1, wherein the circuitry is further configured to receive a predicted distributable amount of traffic.

9. The electronic device of claim 4, wherein one of the cells of the cell cluster is a superordinate cell.

10. The electronic device of claim 4, wherein the circuitry is further configured to transmit a predicted distributable amount of traffic.

* * * * *